United States Patent [19]

Leeds et al.

[11] Patent Number: 4,768,744

[45] Date of Patent: Sep. 6, 1988

[54] APPARATUS FOR SUPPORTING A LOAD IN A DYNAMICALLY BALANCED CONDITION

[76] Inventors: Richard Leeds; Robert Leeds; Bruce Leeds, all of 63 Hemlock Dr., Hempstead, N.Y. 11550

[21] Appl. No.: 900,828

[22] Filed: Aug. 27, 1986

[51] Int. Cl.$^4$ .............................................. E04G 3/00
[52] U.S. Cl. .................... 248/280.1; 248/284
[58] Field of Search ................ 248/280.1, 281.1, 278, 248/349, 276, 284, 1 A, 1 B, 1 C, 1 E, 1 F, 1 H, 1 I, 1 J

[56] References Cited

U.S. PATENT DOCUMENTS

| | | | |
|---|---|---|---|
| 598,218 | 2/1898 | Going | 248/276 |
| 2,036,097 | 3/1936 | Pieper | 248/280.1 X |
| 2,766,007 | 10/1956 | Krilanovich | 248/281.1 X |
| 3,374,347 | 3/1968 | Hirose | 248/276 X |
| 4,068,961 | 1/1978 | Ebner et al. | 248/1 F |
| 4,166,602 | 9/1979 | Nilsen et al. | 248/280.1 |
| 4,432,252 | 2/1984 | Brücher | 248/281.1 X |
| 4,447,031 | 5/1984 | Souder, Jr. et al. | 248/280.1 |
| 4,545,555 | 10/1985 | Koch | 248/280.1 |
| 4,549,710 | 10/1985 | Prince et al. | 248/349 X |
| 4,616,798 | 10/1986 | Smeenge et al. | 248/281.1 |
| 4,632,349 | 12/1986 | Anstey | 248/281.1 |

FOREIGN PATENT DOCUMENTS

| | | | |
|---|---|---|---|
| 0105076 | 4/1984 | European Pat. Off. | 248/280.1 |
| 576890 | 6/1976 | Switzerland | 248/284 |

*Primary Examiner*—Ramon S. Britts
*Assistant Examiner*—Sarah A. Lechok Eley
*Attorney, Agent, or Firm*—Roberts, Spiecens & Cohen

[57] ABSTRACT

A method is provided for supporting a load such as a computer terminal by balancing the load with two opposed parallel forces of different magnitudes which are algebraically added with the weight of the load to result in a gravitationally neutral or statically stable (or dynamically stable) condition whereby the load remains in any position to which displaced and whereby displacement of the load can be effected with ease. There is provided an apparatus for accomplishing the aforegoing which employs a lever for engaging the load for multi-dimensional adjustment to a selected spatial position. A first gravitational control engages the lever and counteracts the weight of the load with a force in excess of that necessary to balance the load. A second gravitational control also engages the lever and counteracts the aforesaid force with a force such that the weight of the load in conjunction with the force of the second gravitational control counterbalances the force of the first gravitational control to provide the aforesaid neutral gravitational neutral condition.

16 Claims, 4 Drawing Sheets

APPARATUS FOR SUPPORTING A LOAD IN A DYNAMICALLY BALANCED CONDITION

FIELD OF INVENTION

This invention relates to support structures and methods and, more particularly, to supports for loads such as computer terminals dynamically balanced so that adjustment between different positions can be made with relative ease.

BACKGROUND

As stated in earlier issued U.S. Pat. No. 4,562,987, the relatively frequent use of computer terminals in offices has significantly changed the physical requirements of office workplaces. Whether the computer terminal is a standalone unit having its own processor or a remote terminal of a central computer system, it generally consists of an input device such as, for example, a keyboard and/or a numeric keypad, and an output device such as, for example, a cathode ray tube (CRT), a liquid crystal display or some other numeric, alpha-numeric or graphic display device. The input device and the display device may be physically separate using, for example, a flexible cord to permit independent movement of the input device for accommodating the individual needs of the worker, or the input device and the display device may be integrated into a single unitary assembly.

A worker at a computer terminal may be required to spend long hours in a more constrained physical posture than is required of workers at various other business tasks. In order to maintain worker comfort and efficiency, more attention must be given to requirements related to the posture and other physical needs of workers stationed at computer terminals. These include appropriate desk height and design, chair design for maintenance of comfortable and efficient posture and an appropriate balance between general lighting and task lighting. It is especially important to position the CRT in height, transverse position, depth position, and vertical axis rotation for comfortable viewing without excessive head and eye motion and without distracting reflections.

A computer terminal represents a substantial capital investment. Many work situations require that several workers have access to a computer terminal but do not warrant the expense of a separate computer terminal for each worker. One solution is disclosed in U.S. Pat. No. 4,305,563 wherein a computer terminal support includes means for permitting rotation about a single vertical axis and for permitting translation of the computer terminal toward and away from the vertical axis. When several workers' desks are arranged together about a single vertical axis, the display of the computer terminal may be rotated about the single vertical axis to face a worker at any one of the grouped desks and may be displaceable toward and away from the worker. Having only a single axis, this device permits very limited positioning of the display device and thus may fail to satisfy all of the requirements of the workers.

U.S. Pat. No. 4,365,561 discloses a pedestal-mounted device for supporting a computer terminal. This device provides rotation of the display device about the vertical axis of the pedestal and about a horizontal axis for angularly positioning the display device and provides vertical motion of the pedestal for vertically positioning the display device and keyboard. This device has very limited provision for horizontally positioning the computer terminal for use by even one worker since its horizontal position is rigidly constrained by the position of the pedestal. Basically, this device requires that the worker move from the normal desk location to an auxiliary work station comprised of the disclosed pedestal-mounted device with its supported computer terminal. For tasks requiring back-and-forth reference to materials at the normal desk location and at the terminal, a substantial amount of chair swivelling or sliding and worker motion is required. If use of the terminal by more than one worker is required, the workers' desks must be arranged with a substantial open space between them so that any one of them requiring access to the computer terminal can rotate the computer terminal about the vertical axis of the pedestal and then either move the regular desk chair up to the computer terminal or use a separate chair maintained at the computer terminal.

U.S. Pat. No. 4,562,987 discloses an arrangement with four pivot posts each having pivoting collars thereon with swivel arms affixed thereto. A terminal support tray is affixed to one of the swivel arms and one of the collars is vertically adjustable on its post. Other features are provided and will yield a total of five degrees of freedom of adjustment.

Other support devices are disclosed in U.S. Pat. No. 2,849,534 for supporting a tray in a drive-in restaurant; U.S. Pat. No. 2,991,138 for supporting a tray; U.S. Pat. No. 3,157,379 for supporting furniture on a wall bracket and U.S. Pat. No. 4,085,961 for supporting a tool box on a pickup truck. None of these additional references addresses or solves the problem of supporting computer terminals for efficient and comfortable use by one or more workers.

In addition to the above and relative to the invention which is to be described in detail hereinbelow, note must also be taken of U.S. Pat. Nos. 3,358,957; 3,832,789; 4,447,031; 4,516,751; 4,545,555; and 4,549,710.

In U.S. Pat. No. 3,358,957, T. L. Lindenmuth discloses a bedstead television support wherein a load is supported between the arms of a bracket which, in turn, is supported on a telescopic lever arm which, in turn, is pivotally supported on a clamp which may be affixed to the frame of a bedstead. This patent fails to reveal the utilization of parallel arrangements exerting forces which are algebraically added to the weight of a load as in the present invention and as will be shown in detail hereinbelow.

N. C. Bartram shows in U.S. Pat. No. 3,832,789 a nestible portable hair dryer involving the use of a counter-balancing feature involving the use of a wound coil spring assembly in which the coiled spring is arranged to permit the free end of a post which is fixed to a dryer element to be pulled to various positions to provide a constant tension to keep a dryer hood in any position selected by a user. The tensioning feature employed in this patent provides substantially constant tension and permits noiseless adjustment of a head between extreme elevated position and a normal elevated operating position. However, the algebraic summing of two forces provided by separate neutralizing elements as in the present invention is not shown.

In U.S. Pat. No. 4,447,031, James Souder reveals a support arm for selectively positioning heavy objects such as television sets. An arrangement is provided which consists of articulated forward and rear arms, each having parallelogram linkages which are each provided with springs to counterbalance a load weight. An adjustable friction brake arrangement is incorporated in a pivotal point of each linkage which applies a braking force to insure stable positioning of each of the arms in any position throughout the motion of the arm system notwithstanding unbalanced conditions. The arrangement herein also fails to reveal a parallel arrangement of counter-balancing forces wherein the algebraic summing of the load and counterbalancing forces is effected as in the present invention.

Charles Westbrook shows in U.S. Pat. No. 4,516,751 a vertically-adjustable bracket for supporting equipment such as video display devices. The disclosed arrangement shows a mechanism for orienting the video display devices at a desired angle and inclination, but the mechanism includes a support plate having a spherical bearing surface which is received in a circular aperture in a bracket arm. The mounting plate is held in place by a threaded shaft which is secured to a slot formed in a spherical bearing surface by a nut. This is unlike the total arrangement shown in the disclosure below as will become readily apparent.

In U.S. Pat. No. 4,545,555, there is illustrated an adjustable arm which includes a base member with a base rotatable joint member connected thereto. While this arrangement shares with the present invention various features such as the utilization of a lever arm connected to a circular pivot arrangement, the instant invention distinguishes therefrom in employing parallel arrangements which are offset against one another and which are algebraically added to the weight of a load.

Dennis Prince et al. reveals in U.S. Pat. No. 4,549,710 a supporting assembly which includes a base member having a spherical depression and a supporting platform having a hemispherical projection. While this shares features of hemispherical elements arranged in nesting relationship, this patent fails completely to reveal the algebraic summation of forces provided by parallel counterbalancing elements as will be described hereinbelow.

SUMMARY OF THE INVENTION

It is an object of the invention to provide improved supports for computer terminals and other similar loads.

It is a further object of the invention to provide improved supports for computer terminals which include features to provide efficient use of such terminals with the possibility of substantially statically balanced adjustability.

It is a further object of the invention to provide a mount for computer terminals and the like wherein such terminals are counterbalanced to provide for ease of movement of the same to desired positions and wherein there are no locks to turn or adjust.

Yet another object of the invention is to provide a mount for a load which is of an improved construction which permits simply raising and lowering and/or swinging the computer terminal to the desired lateral position.

Still another object of the invention is to provide an improved mount which includes a platform which twists and tilts to the most comfortable and productive position for the operator.

In achieving the above and other objects of the invention, the invention provides a method of supporting a load which may be, for example, a computer terminal or CRT. The method of the invention in a general sense comprises balancing a load with two opposed forces of different magnitudes which are algebraically added together with the weight of the load to result in a dynamically balanced condition whereby the load will remain in any position to which it is moved and whereby movement of the load can be effected with a minimum of effort. As will be shown, the method involves generating one of the aforesaid forces with a piston and cylinder displacement. According to a feature of the invention, the piston and cylinder displacement is resisted by the other of the forces which is a frictionally-generated force. These two forces are provided in parallel with one another in a functional sense.

According to another feature of the generalized method of the invention, the force of the piston and cylinder displacement is substantially constant and the frictionally-generated force is adjusted to operate in conjunction with the load to counterbalance the constant force. More specifically, the load is mounted on a pivotal lever and the forces are applied in parallel to the lever. According to another feature of the invention, the method includes adjustably and tiltably mounting the load on the lever. The above and further objects and features of the method of the invention will be described in detail hereinbelow. The invention, however, also involves the provision of improved apparatus.

In accordance with the features of the apparatus of the invention, there is provided an arrangement for adjustably supporting a load that has a maximum and minimum weight parameter, this arrangement comprising a lever for engaging and supporting the load in vertical and horizontal adjustment to a selected spatial position, there being moreover provided a first dynamic or gravitational control for engaging the lever and counteracting the weight of the aforesaid load with a force in excess of that necessary to balance the load. Also provided is a second gravitational control engaging the lever and counteracting the aforesaid dynamic force with a further dynamic force such that the weight of the load in conjunction with the force of the second dynamic or gravitational control counterbalances the force of the first dynamic or gravitational control to provide a balancing of the dynamic forces whereby the load will remain in any spatial postion to which displaced and whereby displacement of the load can be effected with ease.

There are many features incorporated in the present invention which relate to the apparatus thereof. One of these features requires that the first and second controls are physically separate and that they separately engage the lever. Another of the features requires that the load be a computer terminal and include the weight of the computer terminal and the weight of the lever. Still further, another feature involves the provision of a tilt adjusting arrangement on the lever for engaging the computer terminal and providing universal tilt adjustment in addition to the other types of adjustment that are permitted.

As will be shown hereinbelow, an anchor arrangement is provided for supporting the lever and first and second controls and which enables mounting these elements on a supporting structure. This anchor arrangement may preferably include a clamp for clamping the lever and controls to a horizontal planar supporting structure.

Still further features involve that the second control include first and second resilient devices operating in parallel against the force of the first control which operates in parallel to the first and second resilient devices.

As will be explained in detail hereinafter, the anchor which enables clamping onto a supporting structure provides a support for the second control and pivotally supports the aforesaid lever, the first control being extensible and being coupled between the anchor and the lever. Preferably, the first control is a piston and cylinder combination having a gas-filled chamber and being adapted to support a weight in excess of that of the aforesaid load. As will be shown, the second control includes first and second relatively rotatable members with a friction member being provided therebetween. Also provided is an adjustable spring arrangement for controllably urging the rotatable members together to entrap the friction member with a controllable force.

It will be seen hereinbelow that the spring arrangement of the invention includes first and second concentric helical springs. It will also be seen that the lever is attached to the first rotatable member and that the first and second rotatable members have disc-like portions entrapping the friction member therebetween. The first rotatable member includes inner and outer concentric cylindrical parts defining a cylindrical chamber in which the helical springs are accommodated. The adjustable spring arrangement includes a plate having a spline-like coupling with the outer cylindrical part. The plate compresses the springs against the disc-like portion of the first rotatable member to compress the same against the friction member.

In addition to the above, the invention involves the feature whereby the second relatively rotatable member is attached to the anchor and includes inner and outer cylindrical parts, the outer cylindrical part of the second relatively rotatable member telescopically receiving at least a part of the outer cylindrical part of the first relatively rotatable member. Also, the inner cylindrical part of the second relative rotatable member is arranged in nesting relationship inside of the inner cylindrical part of the first relatively rotatable member.

According to still another feature, a threaded member extends axially through the inner cylindrical members, thereby providing a locking arrangement to lock the threaded member in the inner cylindrical members for rotation therein, the threaded member threadably engaging the aforesaid plate to adjust the compression of the springs and there being furthermore provided an arrangement to lock the plate in adjusted position as will be shown hereinbelow.

In further accordance with the invention, the above-noted computer terminal includes a power cable and the lever includes an arm in the form of a downwardly open U-shaped channel including spaced rungs within the channel and being provided with an upwardly open window. The aforesaid cable extends via the window into the channel and is draped over the aforesaid rungs and extends downwardly out of the channel adjacent the second control. Moreover, in accordance with the invention, there are provided cover plates respectively attached to the U-shaped channel at and beneath the aforesaid window. Still further, the tilt adjusting arrangement referred to above, includes a spherical open dish with first and second glide members conformed to and sandwiching this dish, there being moreover provided clamping means to clamp the glide members together to hold the dish in selected tilted position. The clamping arrangement includes, as will be shown below, threadably engaged members adjustably urging the glide members together. The clamping arrangement further includes locking arrangements to prevent the glider members from becoming detached.

In yet another view of the invention, the first control is a piston and cylinder arrangement engaging and permitting adjustment of the aforesaid lever and the second control is an adjustable friction arrangement engaging and permitting adjustment of the same lever. Still further, a mounting arrangement is provided which supports the piston and cylinder arrangement and the adjustable friction arrangement and which constitutes with each of these arrangements a universal pivot support for the aforesaid lever.

The above and other objects, features and advantages of the invention will be found in the detailed description which follows hereinbelow as illustrated in the accompanying drawing.

DETAILED DESCRIPTION

Figure 1:
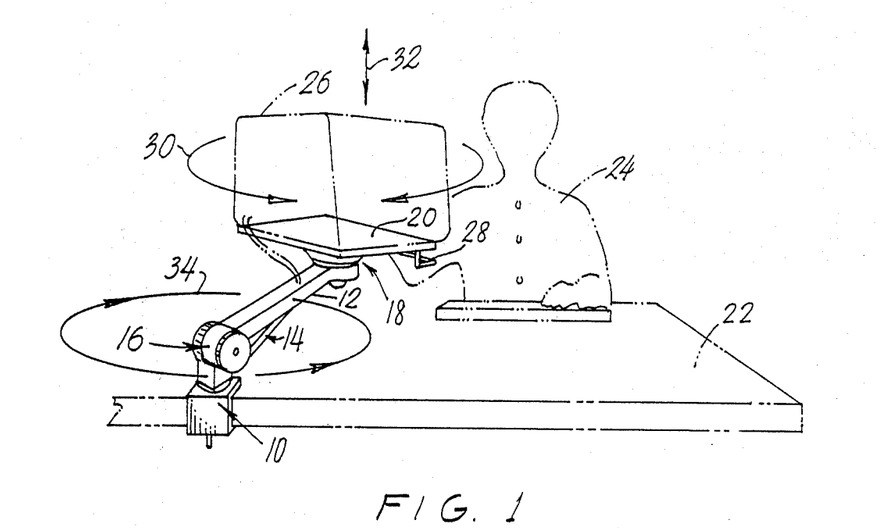
FIG. 1 illustrates a support for a load in dynamically balanced condition according to the invention, a supporting structure, load and operator being shown in phantom.
Figure 2:
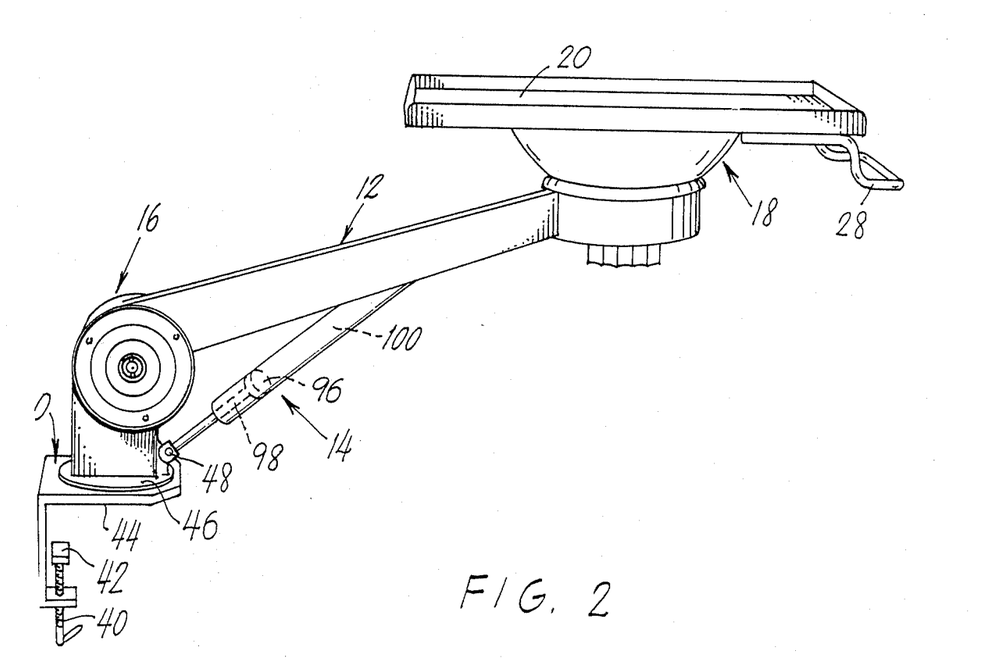
FIG. 2 is a side view of the support of FIG. 1 with the load, desk top, and operator removed.

The illustrative structure illustrated in FIGS. 1 and 2 includes an anchor arrangement 10, a lever arm 12, a piston and cylinder arrangement 14 and a friction arrangement 16. Also incorporated in this illustrative structure is a tilting arrangement 18 supporting a platform 20. The illustration of FIG. 1 also demonstrates a supporting structure 22 which may, for example, be a flat horizontal or planar member which constitutes by way of example the top of a desk. Sitting at the desk is an operator 24 and mounted on the platform 20 is a load 26 which may, for example, be a computer terminal or CRT, the position of which relative to the operator 24 may be critical from a viewpoint of comfort and ease of use as well as for many other reasons. The platform 20 is provided with a handle 28 which may be readily grasped by the operator for purposes of adjusting the position of the load. Such adjustments are indicated by way of example by arrows 30, 32 and 34 which indicate generally the universal type of adjustment which is permitted by the support of the invention to which may be added the tilting adjustment provided by the tilting arrangement 18.

The support of the invention provides a simple way to keep the computer terminal or CRT off the operator's desk yet within reach. The load may readily to clear the desk and may be readily swung laterally and/or lowered to proper working height when the operator wants to use the same. This can all be accomplished with one hand because the arrangement is pneumatically or gaseously controlled and counterbalanced to provide a statically (or dynamically) balanced condition which in turn enables displacing the load to the position at which it is needed. As will be noted, the support simply enables raising and lowering and swinging the load to the position where it is desired that the load be postured.

By way of example, the aforesaid platform 20 may have a dimension of 13 and ⅞" by 11 and ¾" and the platform may be adjusted vertically, by way of example only, from 4 to 16". It will furthermore and by way of example accommodate loads weighing from 15 pounds to 35 pounds. The support of the invention permits rotation 90° to the left or right along a radius of, for example, 23" and the platform may, for example, tilt plus or minus 5° for comfortable, glare-free viewing. The support of the invention may be clamped onto a desk having, for example, a 1½" overhang and a thickness of, for example, 1¼". Provision can also be readily made for flat mount models for desks having no overhang. As will be shown hereinafter, a built-in cable management system maintains the cables hidden and out of the way.

Clamping to a desk top of the anchoring arrangement 10 may be effected through a threadable member indicated at 40, this threaded member being provided with a conventional pad 42 which engages against the bottom of a desk overhang to enable a clamping operation to be effected with respect to a planar section 44 which rests atop the desk or other such supporting structure.

In accordance with the invention, there is provided a method of supporting a load which comprises balancing the load with two opposed parallel forces of different magnitudes which are algebraically added with the weight of the load to result in a statically (or dynamically) stabilized condition whereby the load will remain in any position to which moved and whereby movement of the load can be effected with ease. As will be shown hereinbelow, the forces are provided by controls 14 and 16, the control 14 being referred to as the first control and being a piston and cylinder arrangement which is pivotted to the lever 12 and to a pivotal universal support 46 (see FIG. 2) to provide a force in excess of that necessary to balance or counterbalance the load 26. It will, of course, be understood that when reference is made to the load 26 or the weight of the load there will be understood as being incorporated in this load, the weight of the lever 12 and the tilting arrangement 18 inasmuch as these weights will have to be accounted for as a practical matter. However, reference is made to the weight of the load 26 by way of generality since it is the weight of this load which constitutes by far the bulk of the weight which will have to be dealt with by the provisions of the invention.

Thus, it is seen that one of the algebraic forces employed in accordance with the invention is generated with a piston and cylinder displacement, the piston and cylinder arrangement of the invention being of the type which includes a gas-filled chamber. Such a piston and cylinder arrangement is commercially available and one such available piston and cylinder arrangement may be obtained from Gas Spring Company, Division of Fichtel & Sachs Industries, Inc., Colmar, Pa.

The piston and cylinder arrangement 14 is as noted above connected to anchor arrangement 10 by means of universal pivot 46. This pivot is capable of pivotting about a vertical axis and is pivotal as well on a horizontal pivot pin as indicated at 48. The piston and cylinder arrangement 14 is connected as well to lever 12 by a pivot which is hidden from view in FIG. 2.

The piston and cylinder static force is far in excess of that necessary to move the load 26 upwardly. This movement is resisted by the other of the forces which is the frictionally-generated force provided by the second control 16 which will be described in detail hereinbelow. Thus, it will be noted that the load is mounted on a pivotal lever and two separate forces are applied in parallel to the lever. It will also be noted from what has been stated above, that the load is horizontally and vertically adjustable and tiltably mounted on the lever through the intermediary of the platform 20. As to the apparatus, it will be noted that the apparatus of the invention adjustably supports a load of determinable weight by the use of the lever 14 which indirectly engages and supports the load 26 for multi-positional adjustment to a selected spatial position. It will also be noted that the first and second controls 14 and 16 engage the lever with the force of the second control 16 counteracting the force of the first control 14 to provide a substantially statically (or dynamically) balanced condition whereby the load will remain in any spatial position to which moved and whereby movement of the load can be effected with ease.

Figure 3:
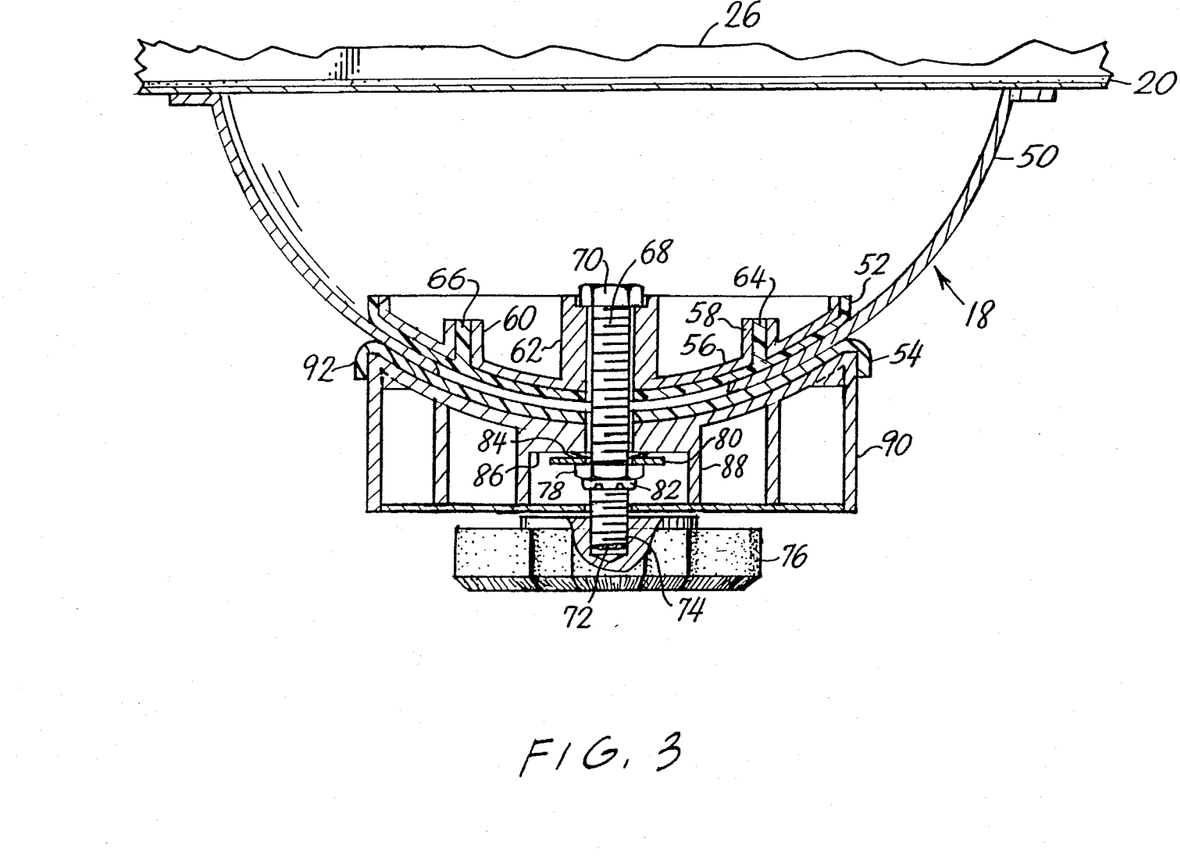
FIG. 3 is a side cross-sectional view of a tilting arrangement employed in the support of FIGS. 1 and 2.

FIG. 3 of the drawing illustrates the tilting arrangement 18 with platform 20 and load 26 being fragmentally illustrated. The tilting arrangement is in majority illustrated in cross-sectional view. This view illustrates a hemispherical dish 50 being entrapped between two glide members 52 and 54 which are preferably of nylon or nylon-coated or the like to provide for a self-lubricating support within which the spherical dish 50 may be readily adjusted for tilting maneuvers.

More particularly, the glide member 52 is accommodated on a framing member 56 having receptacles 58 and 60 illustrated by way of example along with a receptacle 62. Receptacles 58 and 60 respectively receive and accommodate projections 64 and 66. Receptacle 62 receives a threaded member 68 having a hexagonal head 70 and projecting at end 72 into a receptacle 74 in a manually-operated knob 76. There is also mounted on the threaded member 68 a locking arrangement 78 consisting of a washer 80, a lock nut 82 and a spring-type washer 84. These brace against the surface 86 of a receptacle 88 within the bottom supporting framework 90. The glide members and spherical dish are entrapped between the head 70 of threaded member 68 and the arrangement 78 and thus may not become detached therefrom. Since the glide member 54 is provided with hooked peripheral extremity 92, the support 18 is thus prevented from becoming detached from the lever 12 (see FIG. 2) and a certain limited degree of tilting is afforded by a loosening of the threaded member 68. Provision of opening 69 enables the spherical dish 50 to be moved to desired tilted position and the threaded member 68 is then tightened to lock the dish in selected position.

Turning again briefly to FIG. 2, it is seen that the first control 14 consists of a piston and cylinder arrangement. Diagrammatically illustrated in hidden view therein is the piston 96 mounted on piston rod 98 and furthermore, a chamber 100 is defined. The chamber 100 is, as indicated, above a gas-filled chamber so that the piston and cylinder arrangement can be pneumatically operated. The nature of this operation is too-well known to warrant discussion in detail in this text. However, the nature and disposition of the elements of the second control 16 do require explanation and such explanation follows hereinbelow with reference to FIG. 4 wherein appears the second control 16 and a portion of the lever 12 which is attached to an element of the same.

Figure 4:
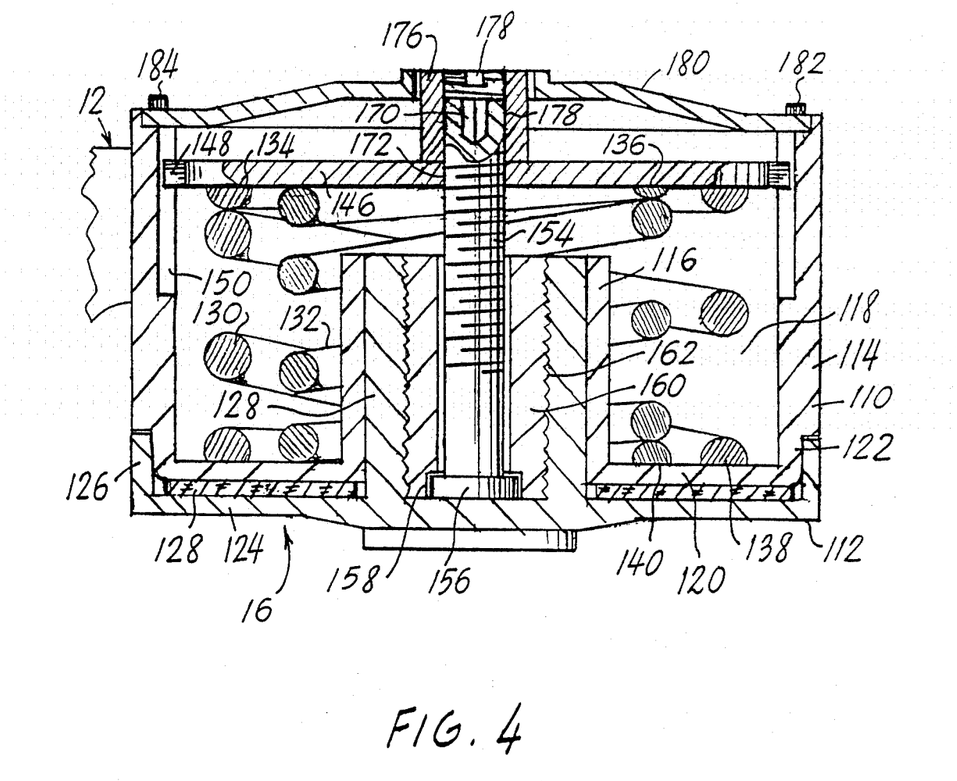
FIG. 4 is a sectional view of the frictional support arrangement employed in accordance with the invention.

The second control 16 includes two relatively rotatable members 110 and 112. The member 110 includes an outer cylindrical part 114 and an inner cylindrical part 116. These two parts define therebetween a cylindrical chamber 118. The outer cylindrical part 114 and inner cylindrical part 116 are connected together by a disc-like portion 120. The cylindrical part 114 includes a part 122 of reduced diameter.

The relatively rotatable member 112 includes a disc-like part 124 and an outer cylindrical part 126 It also includes an inner cylindrical part 128. It will be noted that the outer cylindrical part 126 of relatively rotatable member 112 telescopically receives the part 122 of reduced dimension of the outer cylindrical part 114 of relatively rotatable member 110. This enables the disc-like members 120 and 124 to be displaced towards and away from one another in a manner to be described hereinbelow. At this point, it should be further noted, however, that there is provided between the disc-like members 120 and 124 a friction disc or element 128. This friction disc may be fabricated for example from cork or from any other suitable friction yielding member. This member is entrapped between the disc-like members 120 and 124 and according to the pressure exerted in bringing these disc-like members together, there results a friction which is employed to counteract the effects of the first control 14 as mentioned hereinabove.

Arranged within the cylindrical chamber 118 are two concentric helical springs 130 and 132. These springs may be of like forces, but generally speaking the outer spring 132 is of larger diameter wire than the spring 132 and consequently will generally and preferably be stronger then the same. These helical springs may be provided with flat faces such as indicated by way of example at 134, 136, 138 and 140 in order to enable suitable engagement with the parts between which the helical springs are sandwiched.

One of these parts is a plate which is indicated at 146. This plate 146 is actually in the shape of a disc having a spline-like connection afforded by a tongue 148 extending radially from the plate or disc 146 and finding engagement in a slot 150 extending longitudinally and part way along the outer cylindrical member 114 described hereinabove. Displacement of the tongue longitudinally along the slot 150 is provided by an interior arrangemnt of the plate 146 by a threaded member 154 which takes the form of a bolt, the head of which is indicated at 156 and is accommodated within a receptacle 158 provided in a bushing 160 received within a threaded bore 162 provided on the interior of the inner cylindrical part 128 of the relatively rotatable member 112.

At the other end of the threaded bolt 158 is provided a hexagonal bore 170 adapted to receive, for example, the end of an Allen wrench. With the head 156 entrapped within the receptacle 158, longitudinal displacement of the threaded bolt 154 is not possible. However, due to rotation of this bolt by means of utilization of the wrench in hexagonal bore 170, the threaded engagement 172 is enabled to effect a relative movement of plate 146 along the longitudinal axis of threaded bolt 154. This, in turn, enables a movement of tongue 148 longitudinally in slot 150 as described hereinabove whereby the plate 146 is enabled to partake of a relative displacement with respect to disc-like parts 120 and 124 thus permitting the developing of an increase or decrease of compression on springs 130 and 132 operating in parallel thereby to increase or decrease compression on the disc-like members against the friction member 128 and to increase or decrease the frictional engagement of the same and thereby the counterbalancing force provided by the second control 16 relative to the force exerted by the first control 14.

Also threadably engaging the bolt 154 is a collar 176 having diametrically opposed slots 178 arranged at the exposed end thereof. These slots 178 are engageable by a fork-type wrench enabling rotation of the collar 176 which through the use of engaging threaded surface 178' enables the plate 146 to be locked or held in fixed position once this position has been determined by rotation of the bolt 154 (by utilization of an Allen wrench in the hexagonal bore 170 as described hereinabove).

It will be readily understood that the mounting of the lever 12 on the outer cylindrical member 114 of the relatively rotatable member 110 makes feasible the algebraic addition of the forces generated through controls 14 and 16. These forces are as has been noted opposed forces, one of which is a frictional force, notably that force generated by utilization of the control 16. Finally, it will be noted that a cover plate 180 is provided in the structural arrangement of FIG. 4, this cover plate being held in position for example by screws, such as indicated generally at 182 and 184.

Figure 5:
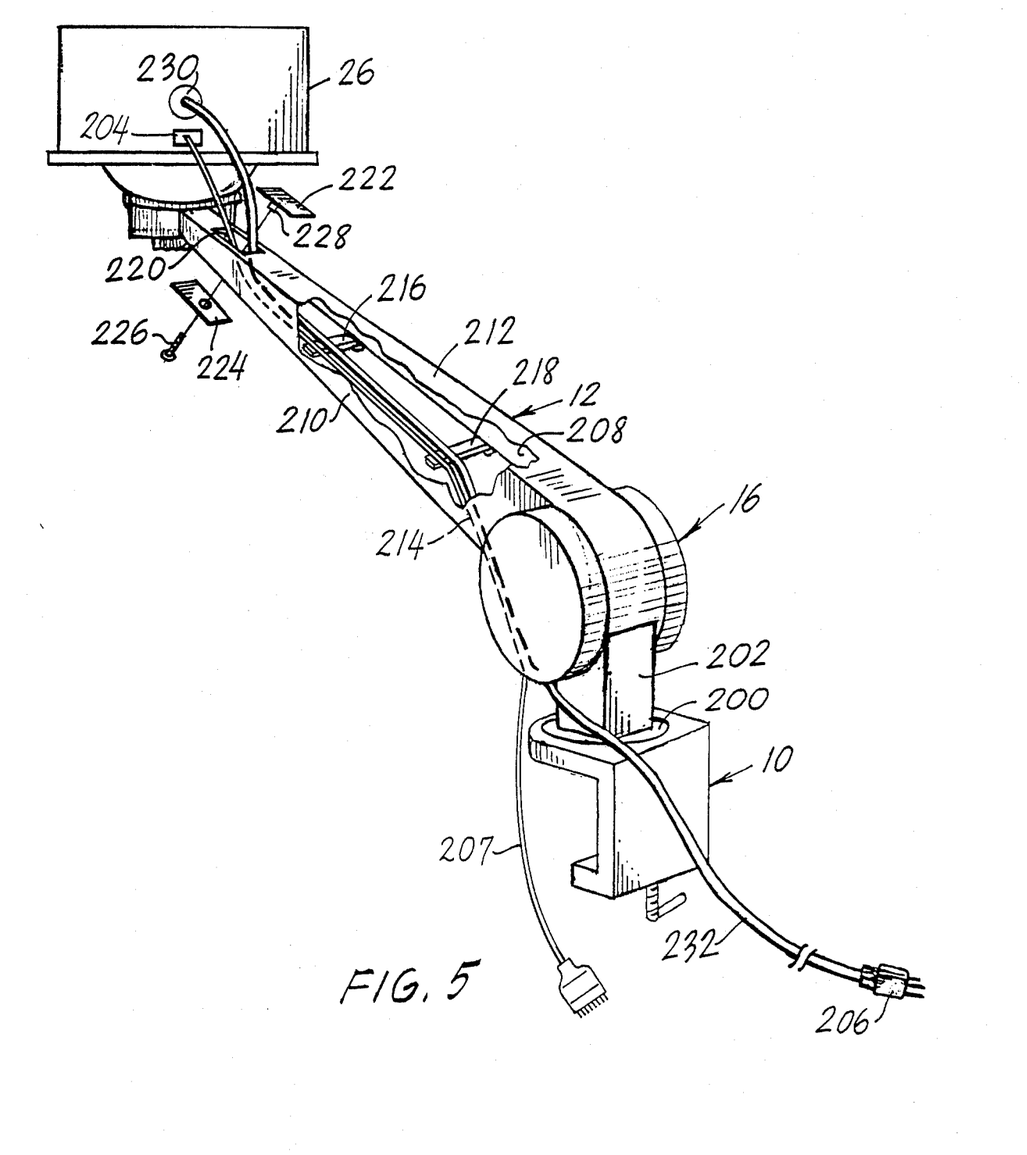
FIG. 5 is a prospective view, partially broken away and partially exploded, illustrating a cable routing employed in the apparatus of FIGS. 1 and 2.

FIG. 5 further illustrates the anchor 10 and at 200 a rotatable disc which supports a post 202 upon which the second control 16 is mounted. The disc 200 rotates about a vertical axis which in conjunction with the rotation afforded within control 16 about a horizontal axis provides a universal pivoting action for the lever 12. FIG. 5 also illustrates the load 26 in the form of a computer terminal having thereon a cable 204 for purposes of supplying electrical power to the terminal or any other electrical connection thereto as may be afforded through the utilization of a plug 206. From FIG. 5, it will be observed that the lever 12 is in fact a U-shaped channel having side walls 208 and 210 connected by a bight 212 and open downwardly as indicated at 214. It will also be noted that the lever 12 is internally provided with a plurality of rungs such as illustrated by way of example at 216 and 218. It will further appear from an inspection of FIG. 5 that the lever is provided with an upwardly opening window 220 which is closed by a cover plate 222. A second cover plate 224 is also employed, the cover plates being connected to each other and to the lever by means of a bolt 226 engaging in a threaded receptacle as indicated generally at 228.

The power cable 204 proceeds from an opening 230 in computer terminal 26 and enters the interior of lever 12 via the window 220. It then proceeds longitudinally through the lever 12 being draped over the rungs 216 and 218 and leaves the lever 12 via downward openign 214 in the vicinity of the control 16. It is provided with an outward electrical extension 232 to which the plug 206 is connected for the purpose of plugging into a power source. Cable 207 is a data-cable with hoods and connectors at each end of the cable. One end is plugged into the back of the CRT, the other end to a computer or other data supply means.

From what has been stated above, there is provided in accordance with the invention an apparatus for adjustably supporting loads of various weights, this apparatus comprising a lever for engaging and supporting the load for varied horizontal and vertical adjustments to a selected spatial position In addition, there is provided a first gravitational or static (or dynamic) control for engaging the lever and counteracting the weight of the load with a force in excess of that necessary to balance the load. There is moreover provided a second gravitational or static (or dynamic) control engaging the lever and counteracting the force of the first control with a force such that the weight of the load in conjunction with the force of the second gravitational control counterbalances the force of the first gravitational control to provide a substantially balanced static (or dynamic) condition. This enables the load to remain in any selected spatial position to which displaced. It further provides that movement of the load can be effected with ease.

For the adjustment of the above-indicated apparatus the first step is to loosen the locknut 176 by engaging slots 178 with an appropriate tool. Then an Allen wrench is inserted into the receptacle 170 and the threaded bolt 154 is rotated to move the plate 146. In this manner springs 130 and 132 are compressed if the load drops by its own weight and are decompressed if the load appears too hard to raise.

It will be understood from what has been stated above, that the springs 130 and 132 operate in parallel. However, reference has also been made above to the utilization of parallel forces provided by controls 14 and 16. Reference to parallel forces exerted by controls 14 and 16 is not intended to mean that these forces are physically parallel to one another in that they exist along parallel axes. Rather, it is intended to convey the idea that these forces do not operate in series with one another although it will be appreciated that modifications of the illustrated structure may enable such forces to be applied in series.

There will now be obvious to those skilled in the art many modifications and variations of the construction and method set forth hereinabove. These modifications and variations will not depart from the scope of the invention if defined by the following claims:

What is claimed is:

1. Apparatus for adjustably supporting a load of determinable weight, said apparatus comprising lever means for engaging and supporting said load for multidimensional adjustment to a selected spatial position, first gravitational control means for engaging said lever means and counteracting the weight of said load with a force in excess of that necessary to balance said load, and second gravitational control means engaging said lever means and counteracting said force with a force such that the weight of said load in conjunction with the force of said second gravitational control means counterbalances the force of the first gravitational control means to provide a substantially neutral gravitational condition whereby the load will remain in any spatial position to which displaced and whereby displacement of the load can be effected in substantially effortless manner; said apparatus further comprising an anchor means for clamping on to a supporting structure, said second control means being mounted on said anchor means and pivotally supporting said lever means, said first control means being extensible and being coupled between said anchor means and lever means; said first control means being a piston and cylinder combination having a gas filled chamber and being adapted to support a weight in excess of that of said load; said second control means including first and second relatively rotatable members, a friction member between said rotatable members, and adjustable spring means for controllably urging the rotatable members together to entrap the friction member with controllable force; said spring means including first and second concentric helical springs, said lever means being attached to said first rotatable member, said first and second rotatable members having disc-like portions entrapping the friction member therebetween, said first rotatable member including inner and outer concentric cylindrical parts defining a cylindrical chamber in which said helical springs are accommodated, said adjustable spring means including a plate having a spline-like coupling with said outer cylindrical part, said plate compressing said springs against the disc-like portion of the first rotatable member to compress the same against said friction member.

2. Apparatus as claimed in claim 1 wherein said first and second control means are physically separate and separately engage said lever means.

3. Apparatus as claimed in claim 1 wherein said load comprises a computer terminal.

4. Apparatus as claimed in claim 3 further comprising tilt adjusting means on said lever means for engaging said computer terminal and providing substantially tilt adjustment therefor.

5. Apparatus as claimed in claim 1 comprising anchor means for supporting said lever means and first and second control means and for mounting the same on a supporting structure.

6. Apparatus as claimed in claim 5 wherein said anchor means includes a clamp for clamping said lever means and first and second control means to a horizontal planar supporting structure.

7. Apparatus as claimed in claim 1 wherein said second control means includes first and second resilient means operating in parallel against the force of said first control means.

8. Apparatus as claimed in claim 1 wherein said second relatively rotatable member is attached to said anchor means and includes inner and outer cylindrical parts, the outer cylindrical part of the second relatively rotatable member telescopically receiving at least a part of the outer cylindrical part of the first relatively rotatable member, the inner cylindrical part of the second relatively rotatable member nesting inside of the inner cylindrical part of the first relatively rotatable member.

9. Apparatus as claimed in claim 8 comprising a threaded member extending axially through said inner cylindrical members, locking means to lock the threaded member in the inner cylindrical members for rotation therein, said threaded member threadably engaging said plate to adjust the compression of said springs, and means to lock said plate in adjusted position.

10. Apparatus as claimed in claim 3 wherein said computer terminal includes a power cable and said lever means includes an arm in the form of a downwardly open V-shaped channel including spaced rungs within the channel and being provided with an upwardly open window, said cable extending via the window into the channel and being draped over said rungs and extending downwardly out of the channel adjacent said second control means.

11. Apparatus as claimed in claim 10 comprising cover plates respectively attached to said U-shaped channel at and beneath said window.

12. Apparatus as claimed in claim 4 wherein said tilt adjusting means includes a spherical open dish, first and second glide members conformed to and sandwiching said dish and clamping means to clamp the glide members together to hold the dish in selected tilted position.

13. Apparatus as claimed in claim 12 wherein said clamping means includes threadably engaged members adjustably urging said glide members together.

14. Apparatus as claimed in claim 12 wherein said clamping means includes locking means to prevent said glide members from becoming detached.

15. Apparatus as claimed in claim 1 wherein said first control means is a piston and cylinder arrangement engaging and permitting adjustment of said lever means and said second control means is an adjustable friction arrangement engaging and permitting adjustment of said lever means.

16. Apparatus as claimed in claim 15 comprising mounting means supporting said piston and cylinder arrangement and said adjustable friction arrangement and constituting with each of said arrangements a universal pivot support for said lever means.

* * * * *